(12) United States Patent
Mckellar (10) Patent No.: US 10,910,116 B2
(45) Date of Patent: Feb. 2, 2021

(54) NUCLEAR REACTORS INCLUDING HEAT EXCHANGERS AND HEAT PIPES EXTENDING FROM A CORE OF THE NUCLEAR REACTOR INTO THE HEAT EXCHANGER AND RELATED METHODS

(71) Applicant: BATTELLE ENERGY ALLIANCE, LLC, Idaho Falls, ID (US)

(72) Inventor: Michael G. Mckellar, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 373 days.

(21) Appl. No.: 15/461,173

(22) Filed: Mar. 16, 2017

(65) Prior Publication Data
US 2018/0268950 A1 Sep. 20, 2018

(51) Int. Cl.
| | | |
|---|---|---|
| *G21C 15/257* | (2006.01) | |
| *G21C 5/02* | (2006.01) | |
| *G21D 1/00* | (2006.01) | |
| *G21C 11/06* | (2006.01) | |
| *G21C 7/04* | (2006.01) | |

(52) U.S. Cl.
CPC ............. *G21C 15/257* (2013.01); *G21C 5/02* (2013.01); *G21D 1/006* (2013.01); *G21C 7/04* (2013.01); *G21C 11/06* (2013.01); *Y02E 30/30* (2013.01)

(58) Field of Classification Search
CPC ........ G21C 5/02; G21C 15/257; G21C 11/06; G21C 7/04; G21D 1/006
USPC .................................. 376/367, 399
See application file for complete search history.

(56) References Cited

U.S. PATENT DOCUMENTS

| | | |
|---|---|---|
| 948,835 A | 2/1910 | Walter |
| 1,335,506 A | 3/1920 | Jones |
| 1,454,053 A | 5/1923 | Jones |
| 1,522,866 A | 1/1925 | Colston |
| 1,524,595 A | 1/1925 | Sward |
| 1,525,094 A | 2/1925 | Jones |
| 1,782,409 A | 11/1930 | Chute |
| 1,790,151 A | 1/1931 | How |
| 1,798,354 A | 3/1931 | Ris |
| 1,853,236 A | 4/1932 | Shadle |
| 2,384,714 A | 9/1945 | Villiger |
| 2,591,658 A | 4/1952 | Haringhuizen |
| 2,693,942 A | 11/1954 | Guala |

(Continued)

FOREIGN PATENT DOCUMENTS

| | | |
|---|---|---|
| CN | 104766636 A | 7/2015 |
| WO | 2014176069 A2 | 10/2014 |

OTHER PUBLICATIONS

US 4,998,481 A, 03/1991, Schott (withdrawn)

(Continued)

*Primary Examiner* — Jack W Keith
*Assistant Examiner* — Daniel Wasil
(74) *Attorney, Agent, or Firm* — TraskBritt (57) ABSTRACT

A nuclear reactor including a reactor core comprising a plurality of fuel materials and a plurality of heat pipes. The nuclear reactor further includes a heat exchanger coupled to the reactor core defining a flow path in an open volume including at least two heat pipes of the plurality of heat pipes. Methods of operating a nuclear reactor include passing fluid through an open volume in a heat exchanger including at least two heat pipes extending from a reactor core.

18 Claims, 7 Drawing Sheets

(56) References Cited

U.S. PATENT DOCUMENTS

| | | | |
|---|---|---|---|
| 2,774,575 A | | 12/1956 | Walter |
| 2,937,079 A | | 5/1960 | Pool |
| 3,378,449 A | | 4/1968 | Roberts et al. |
| 3,400,758 A | | 9/1968 | Lee |
| 3,630,276 A | * | 12/1971 | Kikin .................. F22B 1/023 |
| | | | 165/158 |
| 3,848,430 A | | 11/1974 | Porter et al. |
| 3,935,063 A | | 1/1976 | Dunckel |
| 3,960,655 A | | 6/1976 | Bohanan et al. |
| 3,961,665 A | | 6/1976 | Langbroek et al. |
| 4,163,690 A | | 8/1979 | Jabsen |
| 4,343,349 A | * | 8/1982 | Busch .................. F24D 17/001 |
| | | | 165/47 |
| 4,360,059 A | | 11/1982 | Funke |
| 4,506,183 A | | 3/1985 | Morris |
| 4,842,053 A | | 6/1989 | Yatsuhashi et al. |
| 4,886,111 A | | 12/1989 | Nakai et al. |
| 4,909,316 A | | 3/1990 | Kamei et al. |
| 5,195,575 A | * | 3/1993 | Wylie .................. G21C 15/257 |
| | | | 376/367 |
| 5,217,066 A | | 6/1993 | Killebrew |
| 5,247,548 A | | 9/1993 | Malloy et al. |
| 5,408,510 A | | 4/1995 | Ball et al. |
| 5,915,465 A | | 6/1999 | Fix et al. |
| 6,513,583 B1 | | 2/2003 | Hughes |
| 6,718,001 B2 | | 4/2004 | Hidaka et al. |
| 6,719,041 B2 | | 4/2004 | Docter et al. |
| 6,827,138 B1 | | 12/2004 | Master et al. |
| 8,300,759 B2 | | 10/2012 | Jeong et al. |
| 9,111,651 B2 | | 8/2015 | Bae et al. |
| 9,536,629 B2 | | 1/2017 | Dederer et al. |
| 2011/0094720 A1 | | 4/2011 | Wang et al. |
| 2015/0228363 A1 | | 8/2015 | Dewan et al. |
| 2016/0027536 A1 | | 1/2016 | Mcclure et al. |
| 2016/0329113 A1 | | 11/2016 | El-Genk |
| 2017/0249999 A1 | | 8/2017 | Dewitte et al. |
| 2018/0075931 A1 | * | 3/2018 | Arafat .................. G21C 15/257 |
| 2018/0268950 A1 | | 9/2018 | Mckellar |

OTHER PUBLICATIONS

Mcclure et al., "Design of Megawatt Power Level Heat Pipe Reactors", Los Alamos National Laboratory, LA-UR-15-28840, Nov. 2015, 41 pages.

Rosenthal, "An Account of Oak Ridge National Laboratory's Thirteen Nuclear Reactors", Oak Ridge National Laboratory, ORNL/TM-2009/181, (Aug. 2009) 75 pages.

Demuth, "SP100 Space Reactor Design", Progress in Nuclear Energy, vol. 42, No. 3, (2003) pp. 323-359.

U.S. Appl. No. 15/425,414, filed Feb. 6, 2017, titled "Modular Nuclear Reactors, Fuel Structures, and Related Methods", to Sterbentz et al., 44 pages.

\* cited by examiner

NUCLEAR REACTORS INCLUDING HEAT EXCHANGERS AND HEAT PIPES EXTENDING FROM A CORE OF THE NUCLEAR REACTOR INTO THE HEAT EXCHANGER AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to heat exchangers including heat pipes located within a housing and in communication with a fluid. More particularly, embodiments of the disclosure relate to heat exchangers including heat pipes located within a housing and in communication with a fluid for use in nuclear reactors where the heat pipes extend into a portion of the reactor housing fuel elements, and related methods.

BACKGROUND

Nuclear reactors are used to generate power (e.g., electrical power) using nuclear fuel materials. Nuclear reactors generally include what is referred to as a "nuclear core," which is the portion of the nuclear reactor that includes the nuclear fuel material and is used to generate heat from the nuclear reactions of the nuclear fuel material. The nuclear core may include a plurality of fuel rods, which include the nuclear fuel material.

In order to generate power, heat generated by nuclear reactions carried out within the nuclear fuel materials may be used to boil water, and the steam resulting from the boiling water may be used to rotate a turbine. Rotation of the turbine may be used to operate a generator for generating electrical power.

In some implementations, power production in areas remote from conventional power sources is often desired. In addition, mobile power production is often desired during power outages, natural disasters, or in areas that are remote from conventional power and fuel sources. One option of mobile power production includes diesel-powered or gas-powered electricity generators. However, transportation of fuels for such generators may be unduly burdensome and costly when the generators are located at substantial distances from heavily traveled areas or at times immediately following a natural disaster when normal transportation routes are compromised.

One alternative to the diesel-powered or gas-powered mobile generators discussed above includes nuclear reactors. For example, some mobile nuclear reactors comprise a monolithic reactor core that serves as cladding for fuel elements and heat pipe evaporator sections of the reactor core. Such reactors are disclosed in, for example, U.S. Patent Application Publication No. US 2016/0329113 A1, published Nov. 10, 2016 and U.S. Patent Application Publication No. US 2016/0027536 A1, published Jan. 28, 2016, the disclosure of each of which is hereby incorporated herein in its entirety by this reference. The monolithic reactor core requires a plurality of holes formed therein to house fuel elements of the reactor core and heat pipes. The heat pipe may include a heat transfer fluid directly filling and in contact with the reactor core structure. The heat pipes extend from the reactor core in order to transfer heat from the core to another medium, such as another fluid, via fluid contained in the heat pipes. In order to transfer heat from the fluid in the heat pipe, sleeves are individually fitted over each pipe to form an annulus around the heat pipe. Another fluid (e.g., air) may be passed through the annulus to transfer heat from the fluid in the heat pipe to the air. However, such a configuration may require individual sleeves to be fitted over a large number of heat pipes (e.g., more than one-thousand heat pipes) making manufacture, assembly, and maintenance of such an assembly costly and difficult.

BRIEF SUMMARY

Embodiments disclosed herein include a nuclear reactor including a reactor core comprising a plurality of fuel materials and a plurality of heat pipes. Each heat pipe of the plurality of heat pipes is positioned proximate to at least one fuel material of the plurality of fuel materials. The nuclear reactor further includes a heat exchanger coupled to the reactor core and comprising at least one inlet and at least one outlet. The plurality of heat pipes extends from the reactor core into the heat exchanger. The heat exchanger defines a flow path extending between the at least one inlet and the at least one outlet that intersects at least two heat pipes of the plurality of heat pipes.

In additional embodiments, a nuclear reactor including a reactor core comprising fuel rods and heat pipes, each comprising closed ends. Each heat pipe of the heat pipes is positioned adjacent to at least one fuel rod of the fuel rods. The nuclear reactor further includes a heat exchanger coupled to the reactor core and comprising a housing having at least one inlet and at least one outlet. The heat pipes extend from the reactor core into the heat exchanger. The housing defines an open volume through which a flow path extends between the at least one inlet and at least one outlet. The open volume of the housing encompasses at least two heat pipes of the heat pipes.

In further embodiments, methods of operating a nuclear reactor include transferring energy from a nuclear fuel material to at least two heat pipes in a reactor core, at least partially changing a fluid within the at least two heat pipes from a liquid state to a gaseous state in response to the transferring of the energy, moving the gaseous fluid along a length of the at least two heat pipes from the reactor core to a heat exchanger, and passing another fluid through an open volume in the heat exchanger including the at least two heat pipes to transfer at least a portion of the energy to the another fluid.

DETAILED DESCRIPTION

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a structure comprising heat pipes, fuel elements, heat exchangers, nuclear reactor cores, or a related system. Only those process acts and structures necessary to understand the embodiments of the disclosure are described in detail below. Additional acts may be performed by conventional techniques. Also note, any drawings accompanying the present application are for illustrative purposes only, and are thus not drawn to scale. Additionally, elements common between figures may retain the same numerical designation.

According to embodiments described herein, a nuclear reactor includes fuel elements interspersed with heat pipes within a housing of the nuclear reactor. As discussed below in greater detail, the heat pipes transfer energy (e.g., heat generated from the nuclear reactions of the nuclear fuel material) from the fuel elements and transfer that heat from the reactor core to another fluid in a heat exchange portion of the nuclear reactor. In order to accomplish this heat transfer, the heat pipes extend (e.g., extend continuously, for example as a monolithic and/or unbroken structure) from the nuclear reactor core and into the heat exchange portion. In the heat exchange portion, the housing enables fluid to enter the housing, to pass over at least a portion of more than one heat pipe, and to exit the housing. The passing of the fluid through the housing acts to transfer energy from the heat pipes to the fluid. The energy contained in the fluid may then be utilized to generate, for example, electrical power. For example, the heat exchanger may be configured to transfer heat from the heat pipes to another fluid. Thermal energy in the another fluid may be used for power generation, such as in, for example, a turbine, as may be understood by one of ordinary skill in the art.

Figure 1:
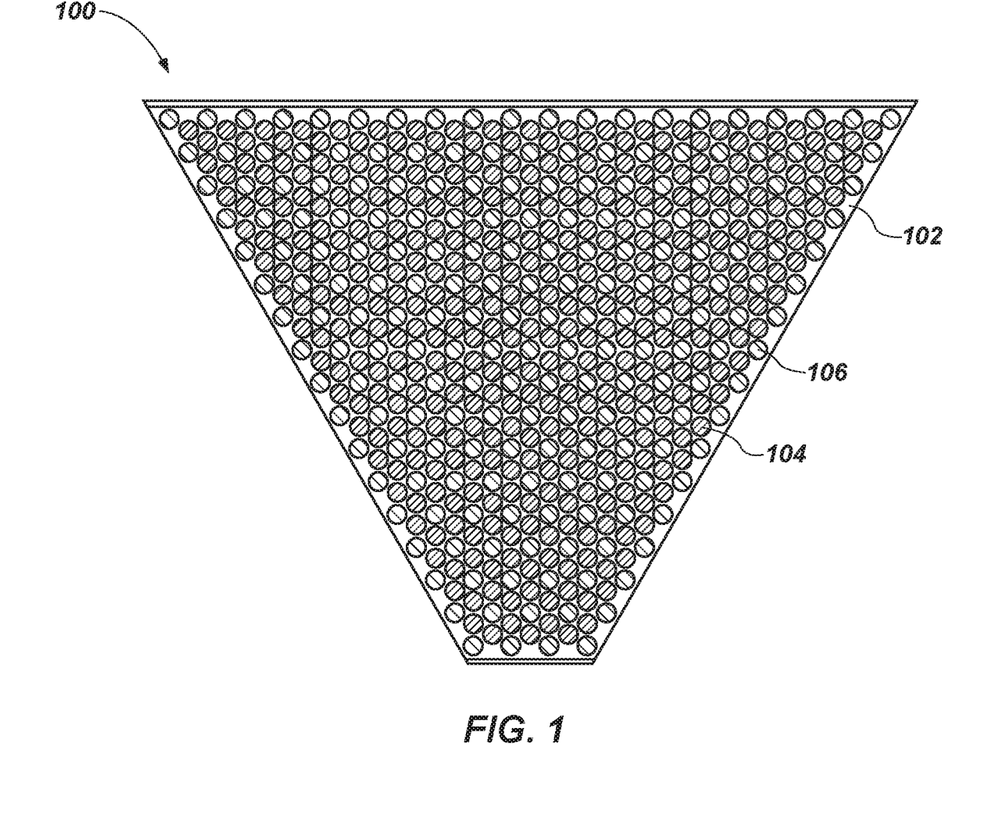
FIG. 1 is a simplified plan view of a portion of a reactor core, according to embodiments of the disclosure.

FIG. 1 is a simplified plan view of a portion of a reactor core 100 including, for example, a reactor core structure 102 (e.g., a monolithic structure) to house fuel elements 104 and heat pipes 106. In other embodiments, the portion of the reactor core 100 may include another structure or structures for containing the fuel elements 104 and the heat pipes 106, such as, for example, a segmented structure or the structure may be similar to those disclosed in, for example, U.S. patent application Ser. No. 15/425,414, filed Feb. 6, 2017, the disclosure of which is hereby incorporated herein in its entirety by this reference.

In some embodiments, the reactor core structure 102 may be defined by a webbed structure defining a plurality of holes therein for housing the fuel elements 104 and the heat pipes 106. In some embodiments, the reactor core structure 102 may have a length greater than about 100 cm (e.g., about 150 cm). The fuel elements 104 and the heat pipes 106 may be substantially surrounded by the reactor core structure 102. In some embodiments, the heat pipes 106 may include a heat transfer fluid directly filling and in contact with the reactor core structure 102. In other words, the heat pipes 106 may not include a pipe wall and the heat transfer fluid may be contained within the holes of the reactor core structure 102. In other embodiments, a structure of the heat pipes 106 may extend through reactor core structure 102 in order to contain and separate the heat transfer fluid in the heat pipe 106 from the reactor core structure 102. As depicted, portions of the reactor core structure 102 between the fuel elements 104 and the heat pipes 106 may exhibit a relatively thin wall to enhance heat transfer between the fuel elements 104 and the heat pipes 106.

As discussed below in greater detail, the fuel elements 104 may extend only the length of the reactor core structure 102 or a portion thereof. For example, the heat pipe 106 may extend beyond each of the fuel elements 104 (e.g., into a heat exchanger portion of the reactor). By way of nonlimiting example, a first portion (e.g., an end portion, a middle portion) of the heat pipe 106 may be adjacent (e.g., surrounded) by the fuel elements 104 and one or more other portions (e.g., another end portion, two opposing end portions) may not be surrounded by the fuel elements 104. In some embodiments, the heat pipe 106 may extend about 2.5 meters beyond the fuel elements 104. In some embodiments, the one or more portions of the heat pipes 106 that are not surrounded by the fuel element 104 may be located proximate one or more structures for transferring heat from heat pipe 106 to another material, which may comprise a fluid, such as in a heat exchanger, as will be described herein. In some embodiments, the one or more portions of the heat pipes 106 that are not surrounded by the fuel element 104 may extend through one or more of an upper reflector, a fission gas plenum, a shield, and one or more heat exchangers.

In some embodiments, the heat pipes 106 comprise an at least partially metal material (e.g., stainless steel, such as 316 stainless steel).

The fuel elements 104 (e.g., fuel pins, fuel rods, etc.) may comprise any suitable nuclear fuel. By way of nonlimiting example, the fuel elements 104 may comprise low-enriched uranium dioxide ($UO_2$), uranium-zirconium (U—Zr), uranium silicide ($U_3Si_2$), uranium carbide (UC), uranium-molybdenum fuels (U—Mo), uranium nitride (UN), uranium niobium (U—Nb), uranium-beryllium ($UBe_x$) and oxides thereof (e.g., BeO—$UO_2$), alloys thereof, other fissile fuels and enrichments, and combinations thereof. In some embodiments, the fuel elements 104 may comprise fuel rods, filled with pellets of the nuclear fuel. In some embodiments, the fuel elements 104 are surrounded with a cladding material.

Figure 2:
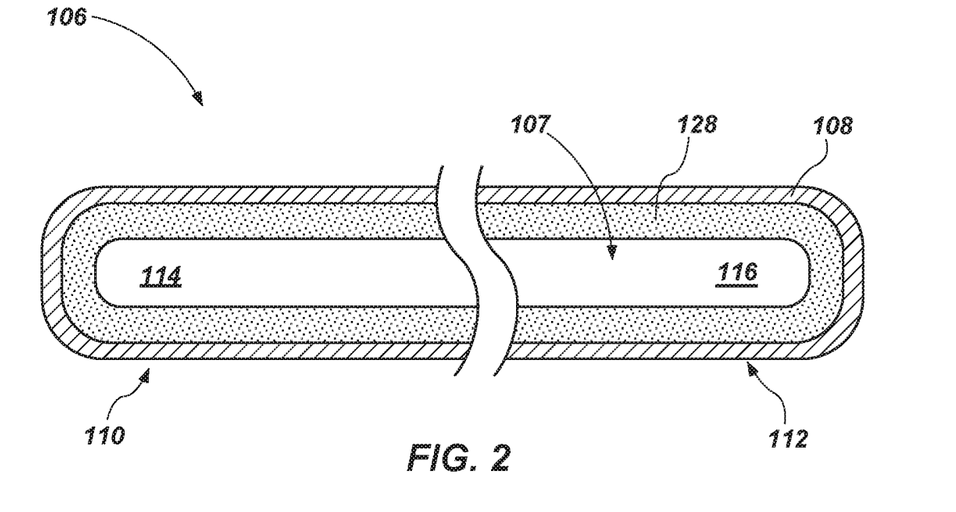
FIG. 2 is cross-sectional view of a heat pipe, according to embodiments of the disclosure.

FIG. 2 is a cross-sectional view of one heat pipe 106. The heat pipe 106 may comprise an outer wall 108 configured to house a heat transfer fluid 107 within the heat pipe 106. The heat transfer fluid 107 may comprise sodium, potassium, another heat transfer fluid, or mixtures thereof. The heat pipe 106 may be configured to transfer heat from the fuel elements 104 (FIG. 1) to another fluid, such as in a heat exchanger of a power generation system comprising the portion of the reactor assembly.

The heat pipe 106 may comprise a first end 110 and a second end 112 (e.g., closed ends). The first end 110 may be exposed to thermal energy to form a vapor 114 in the first end 110. The vapor 114 may travel through the heat pipe 106 to the second end 112, which may exhibit a similar or relatively lower temperature than the first end 110. The vapor 114 may condense at the second end 112 to form a liquid 116. The liquid 116 may be absorbed by a wick 128, which may extend around a central portion of the heat pipe 106. The liquid 116 may travel back to the first end 110 via capillary forces in the wick 128. The outer wall 108 may surround the wick 128. The outer wall 108 may comprise a suitable material for use in the portion of the reactor core 100 (FIG. 1). In some embodiments, the outer wall 108 comprises stainless steel, such as 316 stainless steel.

In some embodiments, the heat pipe 106 may be sealed such that the heat transfer fluid 107 is at least partially (e.g., entirely) prohibited from traveling outside of the heat pipe 106. For example, the heat pipe 106 may be sealed to at least substantially contain the heat transfer fluid 107 within the outer wall 108 of the heat pipe 106.

In some embodiments, the heat pipe 106 may comprises a substantially rigid structure defining a cylindrical volume (e.g., having a substantially constant cross-sectional area) extending from the first closed end 110 of the heat pipe 106 to the second closed end 112 of the heat pipe.

Figure 3:
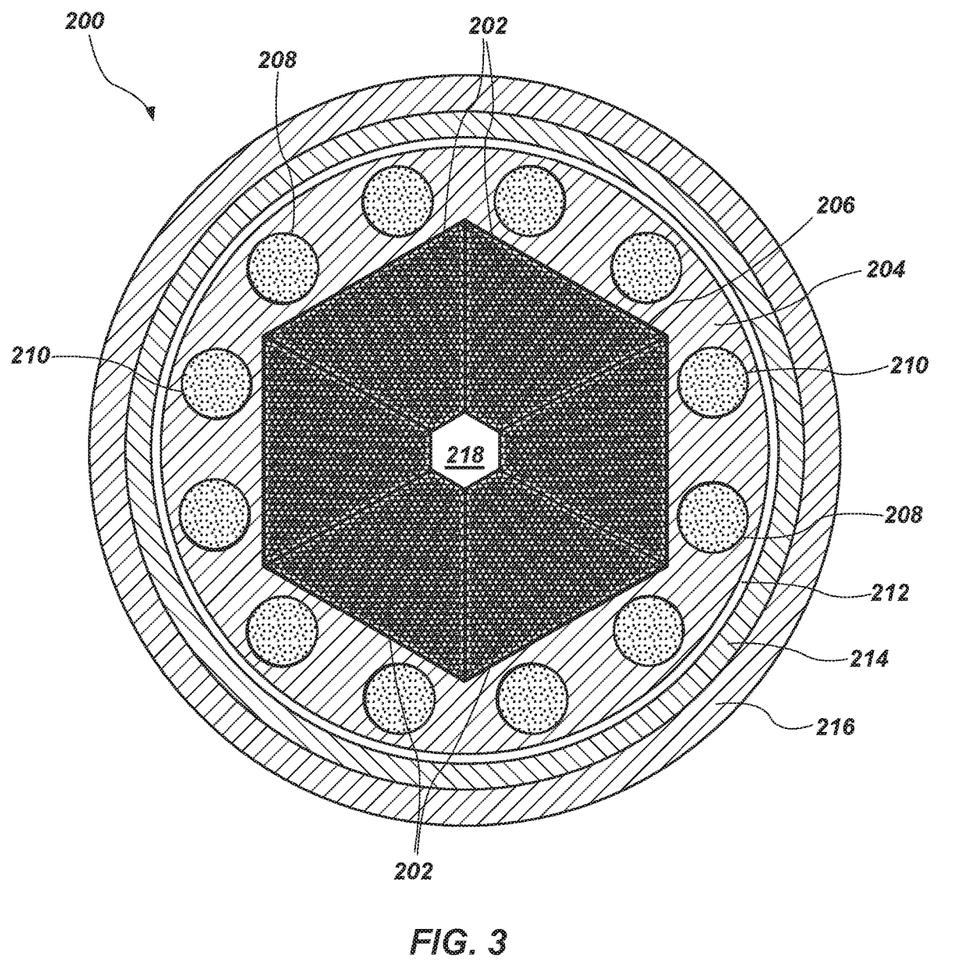
FIG. 3 is a cross-sectional view of a reactor core, according to embodiments of the disclosure.

FIG. 3 is a cross-sectional view of a reactor core 200, which may include one or more sections 202 of fuel elements and heat pipes similar to the portions of the reactor core 100 shown and described above with reference to FIG. 1. The reactor core 200 may include a side reflector material 204 surrounding a central portion 206. The side reflector material 204 may surround the central portion 206 and define an inner tank. The side reflector material 204 may comprise a material formulated and configured to reflect neutrons and reduce or substantially prevent stray neutrons from traveling outside the reactor core 200. For example, the side reflector material 204 may comprise alumina ($Al_2O_3$), graphite, beryllium, or another reflector material. In some embodiments, the side reflector material 204 comprises alumina.

The reactor core 200 may include a plurality of control drums 208 disposed around a periphery thereof. The control drums 208 may be disposed within the side reflector material 204. The control drums 208 may each include a section comprising a reactor poison material 210 formulated and configured to stop a reaction within the reactor core 200. In some embodiments, the reactor poison material 210 comprises boron carbide ($B_4C$). The reactor poison material 210 may extend along a portion of a circumference of the control drums 208. In some embodiments, the reactor poison material 210 extends along about 120° of the circumference of the control drums 208. In use and operation, the control drums 208 may be selectively rotated to control a reaction rate of the reactor core 200.

The reactor core 200 may further include a casing 212 disposed around the side reflector material 204. In some embodiments, the casing 212 comprises a stainless steel material. A neutron shield 214 may surround the casing 212. In some embodiments, the neutron shield 214 comprises boron carbide. The reactor core 200 may further comprise a lead gamma shield 216 disposed around the neutron shield 214. In some embodiments, an air gap may be disposed between the lead gamma shield 216 and the neutron shield 214. In some embodiments, an outer wall or casing may be disposed around the lead gamma shield 216.

The reactor core 200 may include an opening 218 defined at least by outer walls of some of the sections 202. The opening 218 may be located at a center of the central portion 206. In some embodiments, the opening 218 may be hexagonally-shaped. In other embodiments, the opening 218 may have another shape, such as a circular shape, a square shape, a rectangular shape, a polygonal shape, or another shape. The opening 218 may be configured to receive one or more control rods that may be configured to be received by the opening 218. In some embodiments, the control rods may be configured to shut down the reactor core 200, such as in an emergency situation.

The central portion 206 of the reactor core 200 may include the sections 202. The central portion 206 may exhibit a hexagonal shape, a circular shape, a polygonal shape, a square shape, a rectangular shape, a triangular shape, or another shape. In some embodiments, the central portion 206 may be arranged in a hexagonal shape. In some such embodiments, each section 202 of the sections 202 may comprise a portion of a hexagon.

The reactor core 200 may include between about two sections 202 and about twelve sections 202, such as about six sections.

Each section 202 may include a plurality of heat pipes and a plurality of fuel elements. Although FIG. 3 illustrates each section 202 as including a certain number and pattern of heat pipes and fuel elements, the disclosure is not so limited. In some embodiments, each section 202 may include between about 100 and about 300 heat pipes, such as between about 125 and about 275, between about 150 and about 250, or between about 175 and about 225 heat pipes. In some embodiments, each section 202 may include about 204 heat pipes. Each section 202 may include between about 200 and about 500 fuel elements, such as between about 250 and about 450, or between about 300 and about 400 fuel elements. In some embodiments, each section comprises about 352 fuel elements. In some embodiments, the central portion 206 is configured such that reactor control blades may be disposed between adjacent sections 202 to control the reactor core 200.

In some embodiments, the reactor core 200 may be configured to provide between about 2 MW and about 8 MW of power, such as about 5 MW of power.

Figure 4:
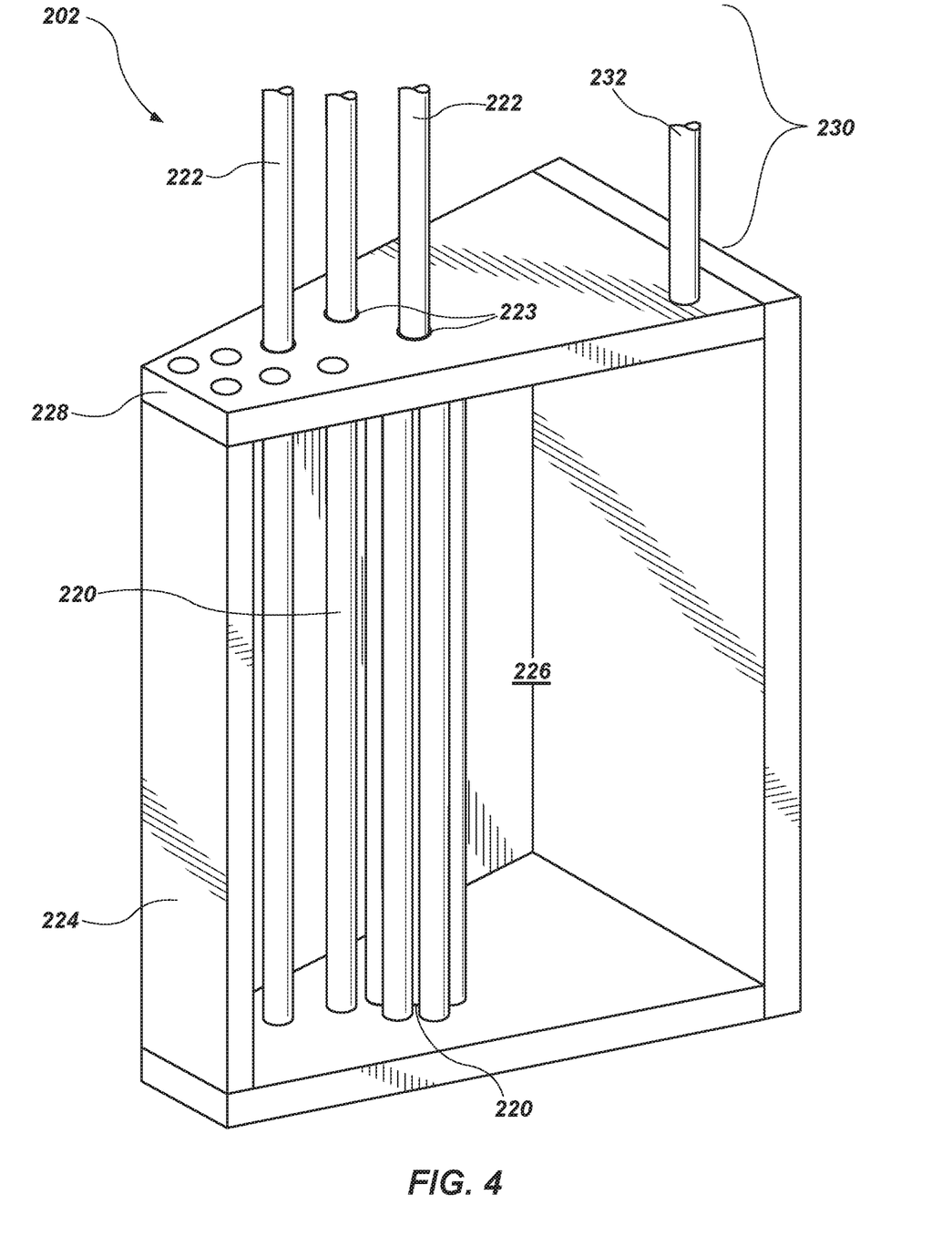
FIG. 4 is a perspective view of a partially assembled section of the reactor core of FIG. 3.

FIG. 4 is a perspective view of a section 202 of the reactor core 200 of FIG. 3. The section 202 may include a plurality of heat pipes 222 and a plurality of fuel elements 220 (e.g., fuel pins, fuel rods, etc.), only a few of which are illustrated for clarity.

The section 202 may include a housing 224 defining an inner tank 226 therein. The plurality of heat pipes 222 and the plurality of fuel elements 220 may extend from a top of the housing 224 (e.g., top plate 228) to a bottom of the top housing 224. A bottom of each of the fuel elements 220 and each of the heat pipes 222 may be received in respective cavities in the housing 224. The housing 224 may be configured to orient and position each of the fuel elements 220 and each of the heat pipes 222 in the section 202 relative to one another. For example, the housing 224 may be configured to orient the heat pipes 222 such that a majority of the heat pipes 222 are surrounded by about six fuel elements 220, similar to the pattern of heat pipes 106 and fuel elements 104 described above with reference to FIG. 1.

The heat pipes 222 may extend through the top plate 228 to a location (e.g., a heat exchanger portion 230) where heat may be transferred from the heat pipes 222 to another fluid. In some embodiments, the heat pipes 222 may be welded to the top plate 228 at a boundary 223 between the heat pipes 106 and the upper reflector. In some embodiments, as discussed below, the heat pipes 222 may also extend through another portion of the housing 224 (e.g., a bottom portion) to a location (e.g., another heat exchanger portion) where heat may be transferred from the heat pipes 222 to another fluid.

The heat pipes 222 may be substantially similar to the heat pipe 106 described above with reference to FIGS. 1 and 2. In some embodiments, the heat pipes 222 comprise an outer portion 230 comprising the same material as the top plate 228 (e.g., stainless steel, such as 316 stainless steel). The heat pipes 222 may be filled with sodium, potassium, or a combination thereof. In some embodiments, the heat pipes 222 are filled with sodium.

The inner tank 226 may enclose a volume defined by the housing 224, which may comprise a metal material, such as stainless (e.g., 316 stainless steel). A fill tube 232 may extend through an opening in the top plate 228 into the inner tank 226. The fill tube 232 may facilitate filling the inner tank 226 with one or more materials. In some embodiments, the inner tank 226 is filled with a heat transfer fluid. The heat transfer fluid may facilitate heat transfer between the fuel elements 220 and the heat pipes 222. Accordingly, the inner tank 226 may be filled with a heat transfer fluid, which may substantially fill the inner tank 226 in the inner tank 226 and contact each of the heat pipes 222 and each of the fuel elements 220. In some embodiments, the heat transfer fluid may form a thermal bond with the heat pipes 222 and the fuel elements 220. It will be understood that the inner tank 226 may be substantially filled with the heat transfer fluid such that there are substantially no air or voids in the inner tank 226. The heat transfer fluid may comprise sodium, potassium, or a combination thereof. In some embodiments, the heat transfer fluid comprises sodium. In some such embodiments, the heat transfer fluid may be compatible with a fluid in the heat pipes 222. By way of nonlimiting example, a fluid in the heat pipes 222 may comprise potassium and the heat transfer fluid may comprise sodium. In some embodiments, the heat transfer fluid may be configured to boil at a temperature higher than about 880° C., such as where the heat transfer fluid comprises sodium. By way of comparison, conventional reactor cores may have maximum operating temperatures of about 700° C.

The heat transfer fluid in the inner tank 226 may form an effective and superior thermal bond between the fuel elements 220 and the heat pipes 222. The heat transfer fluid may distribute heat uniformly throughout the inner tank 226 through conductive and convective fluid heat transfer mechanisms. In some embodiments, the heat transfer fluid in the inner tank 226 may facilitate uniform heating of the heat pipes 222 in the reactor core 200, reducing a potential for cascade heat pipe failures and reducing localized fuel element and heat pipe "hot spots" (e.g., regions of the fuel elements 220 and the heat pipes 222 that exhibit a relatively higher temperature than other portions of the fuel elements 220 and the heat pipes 222). The heat transfer fluid may not be subject to thermal stresses as a reactor core structure may be.

Figure 5:
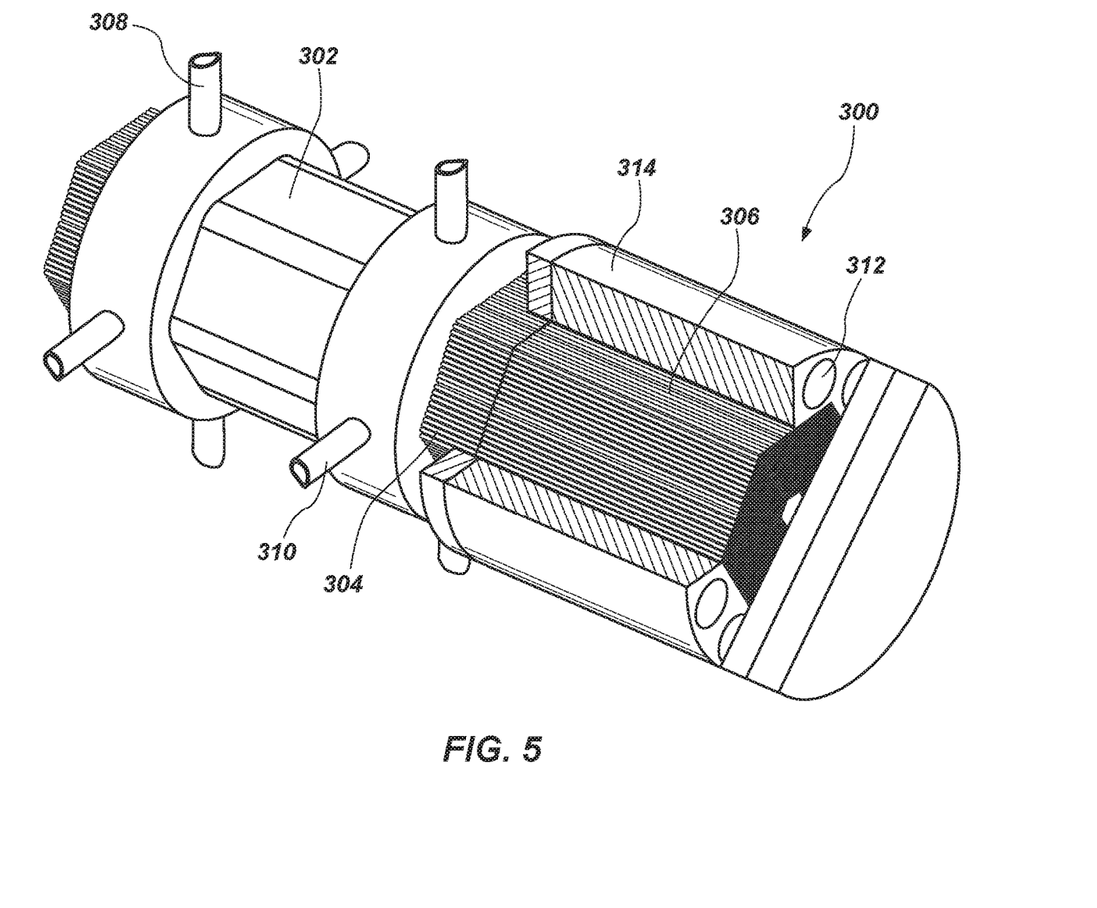
FIG. 5 is a simplified cut-away perspective view of a reactor assembly including a reactor core operably coupled to a heat exchanger, according to embodiments of the disclosure.

FIG. 5 is a simplified cut-away perspective view of a reactor assembly including a reactor core 300 operably coupled to a heat exchanger 302. The reactor core 300 may be substantially similar to the reactor core 200 described above with reference to FIGS. 3 and 4. In some embodiments, the reactor core 300 may have a diameter of about 1 meter and a length of about 1.5 meters.

The reactor core 300 includes a plurality of heat pipes 304 extending therethrough. The heat pipes 304 may extend from the reactor core 300 to the heat exchanger 302. A material within the heat pipes 304 may be heated in the reactor core 300 by fuel elements 306 in the reactor core 300.

The heated material in the heat pipes 304 may be cooled in the heat exchanger 302. The heat exchanger 302 may comprise one or more inlet connections 308 for operably coupling the heat exchanger 302 to a heat transfer fluid and one or more outlet connections 310 for discharging a heated heat transfer fluid from the heat exchanger 302. The heat transfer fluid may be heated by the heat pipes 304 in the heat exchanger 302. The heated heat transfer fluid may be used to produce power, as will be understood by those of ordinary skill in the art.

The reactor core 300 may be surrounded by a plurality of rotatable control drums 312 configured to control a reaction rate of the reactor core 300. A side reflector 314 may surround the reactor core 300. The side reflector 314 may comprise any neutron reflector material such as, for example, beryllium oxide (BeO), stainless steel (e.g., 316 stainless steel), or alumina ($Al_2O_3$). The plurality of rotatable control drums 312 may be disposed within the side reflector 314.

As discussed above, the interior or inner tank of the heat exchanger 302 may be substantially open (e.g., free of structures surrounding the heat pipes 304) such that fluid flowing between the inlet connections 308 and the outlet connections 310 may travel substantially freely between the heat pipes 304. For example, the fluid may intersect (e.g., travel past or around) multiple heat pipes 304 within the heat exchanger 304 as the fluid travels between the inlet connections 308 and the outlet connections 310.

Figure 6:
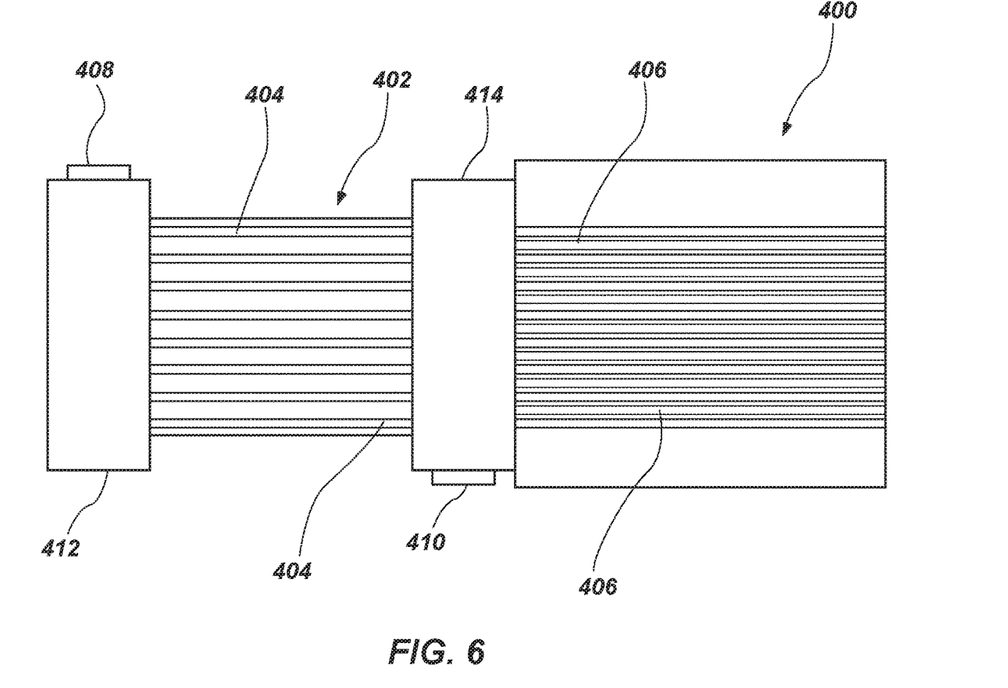
FIG. 6 is a simplified cut-away side view of a reactor assembly including a reactor core operably coupled to a heat exchanger, according to embodiments of the disclosure.

For example, FIG. 6 is a simplified cut-away side view of a reactor assembly including a reactor core 400 operably coupled to a heat exchanger 402. The reactor core 400 and heat exchanger 402 may be substantially similar to the reactor cores 200, 300 and heat exchanger 302 described above with reference to FIGS. 3 through 5.

The reactor core 400 includes a plurality of heat pipes 404 extending therethrough. The heat pipes 404 may extend from the reactor core 400 to the heat exchanger 402. A material within the heat pipes 404 may be heated in the reactor core 400 by fuel elements 406 in the reactor core 400. It is noted that only some of the heat pipes 404 and the fuel elements 406 are shown for the sake of clarity.

The heated material in the heat pipes 404 may be cooled in the heat exchanger 402. The heat exchanger 402 may comprise one or more inlet connections 408 for operably coupling the heat exchanger 402 to a heat transfer fluid and one or more outlet connections 410 for discharging a heated heat transfer fluid from the heat exchanger 402. The outlet connections 410 may be formed in an upper housing portion 412 of the heat exchanger 402. As above, the upper housing portion 412 may include one or more structures (e.g., plates) for supporting the heat pipes 404 passing through the upper housing portion 412. The inlet connections 408 may be formed in a lower housing portion 414 of the heat exchanger 402. The lower housing portion 414 may include one or more structures (e.g., plates) for supporting the heat pipes 404 passing to or through the lower housing portion 414.

In operation, the heat transfer fluid may be heated by the heat pipes 404 in the heat exchanger 402. As above, the interior or inner tank of the heat exchanger 402 may enable fluid (e.g., atmospheric air) to travel (e.g., be forced) through the inlet connections 408 and into the interior or inner tank of the heat exchanger 402 where the fluid may pass over numerous (e.g., more than one) heat pipes 404 in order to transfer energy from the heat pipes 404 to the fluid. The heat transfer fluid may then pass out of the interior or inner tank of the heat exchanger 402 through the outlet connections 410. For example, the interior or inner tank of the heat exchanger 402 may be substantially open (e.g., free of structures surrounding the heat pipes 404) such that fluid flowing between the inlet connections 408 and the outlet connections 410 may travel substantially freely between the heat pipes 404 (e.g., the fluid may travel past or around multiple heat pipes 404 within the heat exchanger 402. The heated heat transfer fluid may be used to produce power, as will be understood by those of ordinary skill in the art.

In some embodiments, the heat exchanger 402 may operate similar to a shell and tube heat exchanger. However, unlike the structure of conventional shell and tube heat exchanger designs, the heat pipes 404 may be sealed, rather than open at either end to let a liquid pass therethrough as is typical in conventional shell and tubes designs. The heat exchanger 402 enables the transfer of energy from the heat transfer fluid in the sealed heat pipes 404 to be transferred to the fluid. Such transfer of energy enables the heat transfer fluid within heat pipes 404 to travel back to the reactor core 400 in order to receive additional energy from the fuel elements 406 in the reactor core 400. For example, the heat transfer fluid may return to a liquid state from a gas state in the heat exchanger 402 and may travel back to the reactor core 400 (e.g., via the wick 128 (FIG. 2)) in order to absorb additional heat energy from the fuel elements 406 in the reactor core 400 in order to again be changed to a gaseous state and return to the heat exchanger 402 in a closed or sealed cycle within each heat pipe 404.

Figure 7:
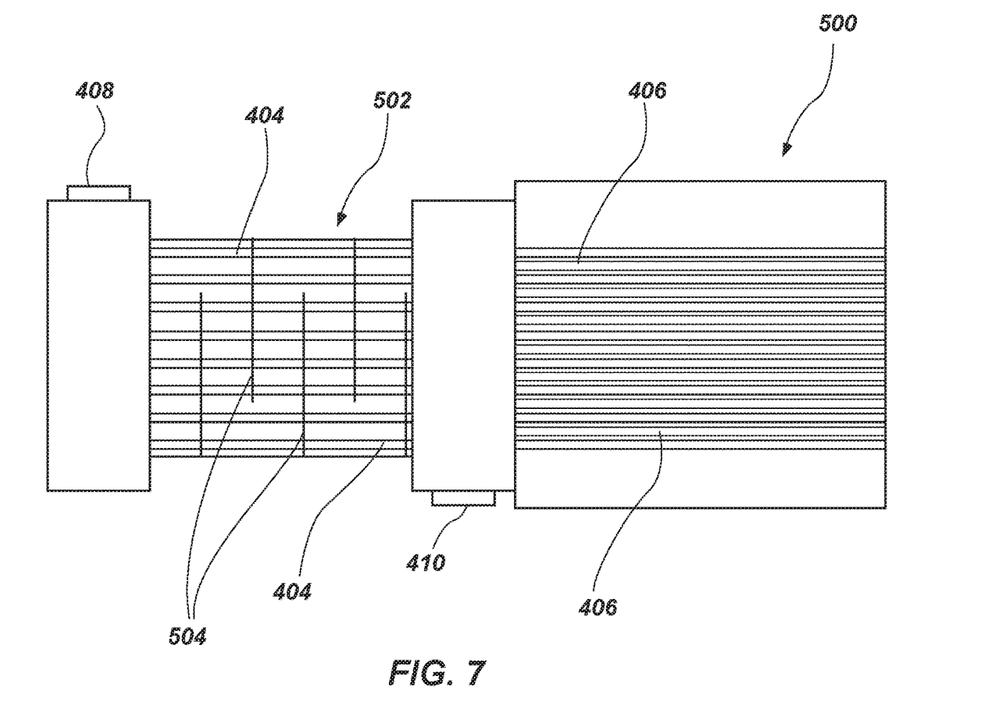
FIG. 7 is a simplified cut-away side view of a reactor assembly including a reactor core operably coupled to a heat exchanger including baffles, according to embodiments of the disclosure.

FIG. 7 is a simplified cut-away side view of a reactor assembly including a reactor core 500 operably coupled to a heat exchanger 502. The reactor core 500 and heat exchanger 502 may be substantially similar to the reactor cores 200, 300, 400 and heat exchangers 302, 402 described above with reference to FIGS. 3 through 6.

The reactor core 500 includes the heat pipes 404 extending from the reactor core 500 to the heat exchanger 502. A material within the heat pipes 404 may be heated in the reactor core 500 by the fuel elements 406 in the reactor core 500. As above, it is noted that only some of the heat pipes 404 and the fuel elements 406 are shown for the sake of clarity.

The heat exchanger 502 includes one or more baffles 504 positioned in the heat exchanger 502. It is noted that while the baffles 504 are depicted in FIG. 7 as being substantially planar, in other embodiments, the baffles may exhibit a nonplanar shape (e.g., an arced or angled shape).

The baffles 504 extend from an outer or exterior portion of the housing of the heat exchanger 502 into an open volume within the heat exchanger 502. The baffles 504 are positioned and configured to create a winding (e.g., spiral, helical, twisted, cyclical, tortuous, etc.) fluid path through the heat exchanger 502. For example, the heated material in the heat pipes 404 may be cooled in the heat exchanger 502 by flowing the fluid (e.g., atmospheric air) through the inlet connections 408 into the interior or inner tank of the heat exchanger 502 where the fluid may pass over numerous (e.g., more than one) heat pipes 404 in order to transfer energy from the heat pipes 404 to the fluid. The heat transfer may then pass out of the interior or inner tank of the heat exchanger 502 through the outlet connections 410. The baffles 504 act to direct the fluid over one or more of the heat pipes 404 on multiple occasions via the spiral path of the fluid in order to increase or maximize the amount of energy that may be transferred from the heat pipes 404 to the fluid. The heated heat transfer fluid may be used to produce power, as will be understood by those of ordinary skill in the art.

Figure 8:
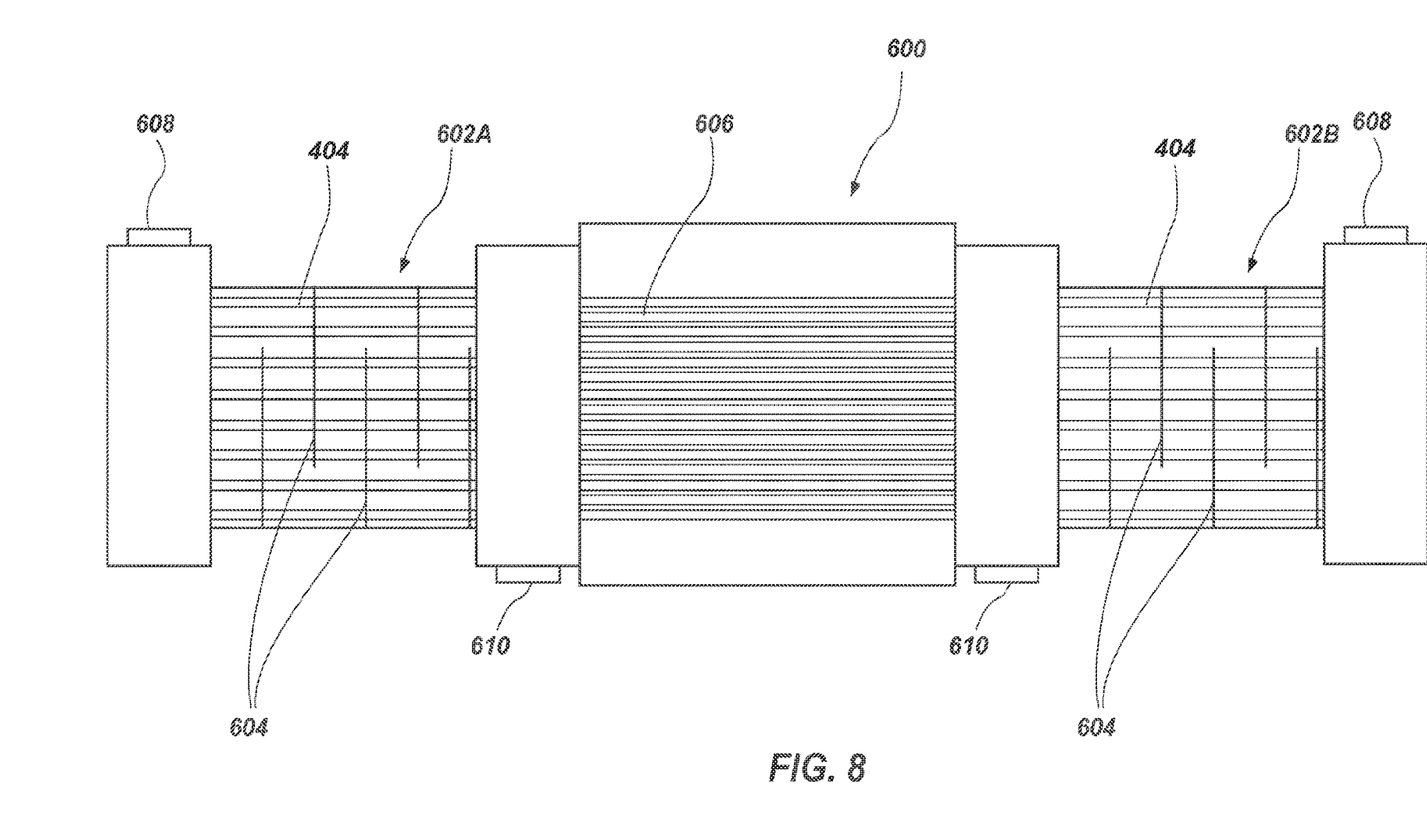
FIG. 8 is a simplified cut-away side view of a reactor assembly including a reactor core operably coupled to multiple heat exchangers, according to embodiments of the disclosure.

FIG. 8 is a simplified cut-away side view of a reactor assembly including a reactor core 600 operably coupled to multiple heat exchangers 602A, 602B. The reactor core 600 and heat exchangers 602A, 602B may be substantially similar to the reactor cores 200, 300, 400, 500 and heat exchangers 302, 402, 502 described above with reference to FIGS. 3 through 7.

The reactor core 600 includes heat pipes 404 extending from the reactor core 600 to the heat exchangers 602A, 602B. As depicted, the heat pipes 404 may extend past the fuel elements 606 and the reactor core 600 in both lateral directions such that opposing ends of the heat pipes 404 may be received in heat exchangers 602A, 602B positioned at either end of the reactor core 600. A heat transfer material within the heat pipes 404 may be heated in the reactor core 600 by the fuel elements 606 in the reactor core 600. As above, it is noted that only some of the heat pipes 404 and the fuel elements 606 are shown for the sake of clarity.

In some embodiments, each of the heat exchanger 602A, 602B includes one or more baffles 604 positioned in the heat exchanger 602A, 602B and/or one or more inlets 608 and outlets 610.

Figure 9:
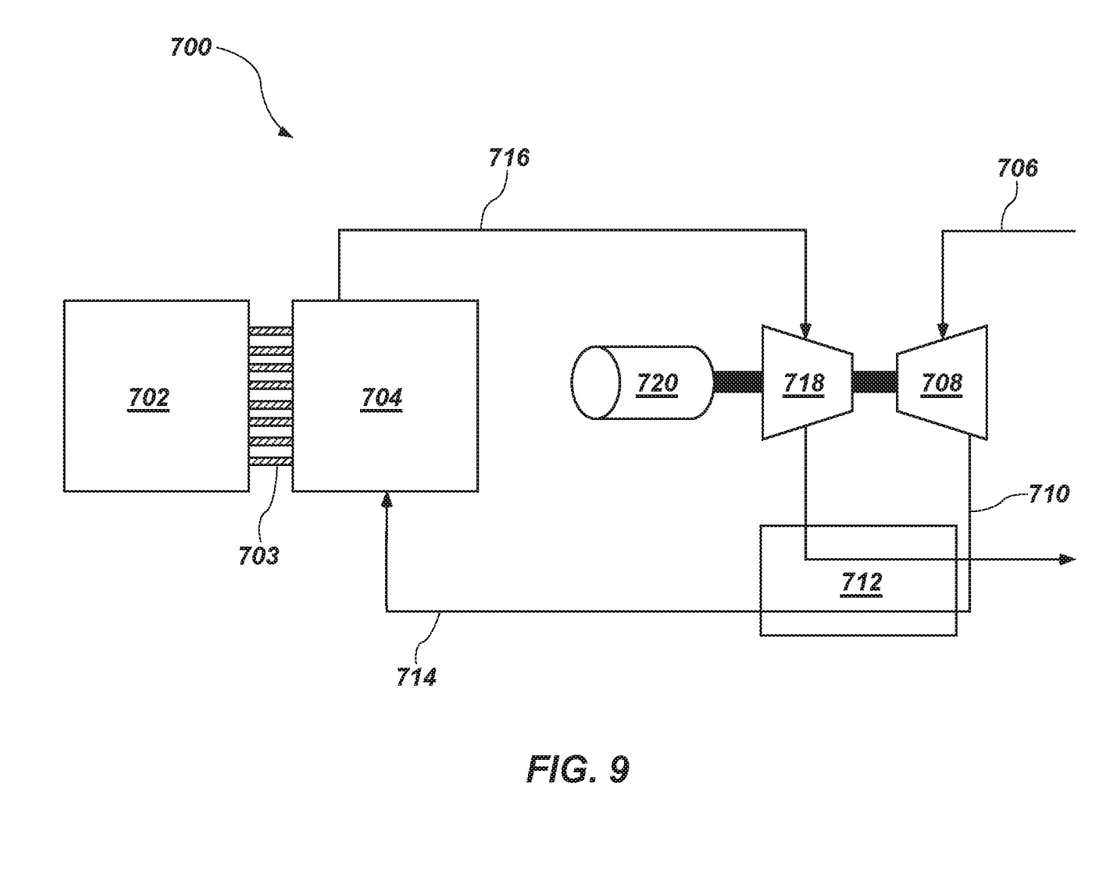
FIG. 9 is a simplified schematic illustrating a system for power generation, according to embodiments of the disclosure.

FIG. 9 is a simplified schematic illustrating a system 700 for power generation, according to some embodiments of the disclosure. The system 700 may include a nuclear reactor core 702 configured to generate heat. The reactor core 702 may comprise a plurality of heat pipes 703 configured to transfer heat from fuel elements of the reactor core 702 to a fluid outside of the reactor core 702. The reactor core 702 may be coupled to a heat exchanger 704 through the heat pipes 703, which may extend from the reactor core 702 to the heat exchanger 704. The reactor core 702 and the heat exchanger 704 may be substantially similar to the reactor cores 200, 300, 400, 500, 600 and heat exchangers 302, 402, 502, 602A, 602B described above with reference to FIGS. 3 through 7.

A fluid 706 may be compressed in a compressor 708 to form a compressed fluid 710. The compressed fluid 710 may pass through a recuperator 712 wherein the compressed fluid 710 is partially preheated to form a preheated fluid 714. The preheated fluid 714 may be passed across the heat pipes 703 extending into the heat exchanger 704 to heat the preheated fluid 714 and form a heated fluid 716. Energy from the heated fluid 716 may be recovered in a turbine 718, which may be coupled to a power generator 720 to produce power. In some embodiments, the power generator 720 may be operably coupled to the compressor 708 to drive the compressor 708.

In some embodiments, the fluid 706 may comprise air. In other embodiments, the fluid 706 may comprise carbon dioxide, nitrogen, or other fluid through which heat may be exchanged.

Although FIG. 9 illustrates that the system 700 as comprising an open cycle, the disclosure is not so limited and the system 700 may comprise any system for heat recovery, such as, for example, a Brayton cycle system. One of ordinary skill in the art will understand that the reactor core 702 may be used in any type of system for power generation.

In some embodiments, the reactor core 702 may be configured to provide between about 2 MW and about 8 MW of power, such as between about 2 MW and about 4 MW, between about 4 MW and about 6 MW, or between about 6 MW and about 8 MW of power. In some embodiments, the reactor core 702 is configured to provide about 5 MW of power.

Embodiments of the instant disclosure may be particular useful in providing a heat exchanger for a nuclear reactor that is relatively less complicated in structure than conventional heat exchangers while still providing a comparable amount of heat transfer. For example, as discussed above, conventional heat exchangers include sleeves that are individually fitted over each heat pipe in the heat exchanger to form an annulus around the heat pipe where another fluid is passed through the annulus to transfer heat from the fluid in the heat pipe to the air. Such configurations require plenums on each end of the heat pipe where the fluid flow path of each heat pipe is separate from adjacent heat pipes. Such a configuration may require sleeves to be fitted over a large number of heat pipes (e.g., more than one-thousand heat pipes) making manufacture, assembly, and maintenance of such an assembly difficult. Embodiments of the instant disclosure simply the heat exchanger design by forming an open volume around the heat pipes where a fluid may travel freely between multiple heat pipes between an inlet and outlet. The further implementation of baffles to provide a convoluted fluid flow path may further increase the amount of heat transfer in the heat exchanger.

Such configurations are believed to provide a comparable or even greater amount of heat transfer, while reducing the amount of structure in the heat exchanger (e.g., by not requiring each heat pipe to be individually sleeved).

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A nuclear reactor, comprising:
   a reactor core comprising
      a plurality of fuel materials and a plurality of heat pipes interspersed with
      the plurality of fuel materials,
         each heat pipe of the plurality of heat pipes being partially positioned and configured to transfer energy from at least one fuel material of the plurality of fuel materials; and
   a first heat exchanger and a second heat exchanger, wherein
      the first heat exchanger and the second heat exchanger are coupled to the reactor core at opposing ends,
      each of the first heat exchanger and the second heat exchanger comprising at least one inlet and at least one outlet,
      the plurality of heat pipes extending from the reactor core into the first heat exchanger and the second heat exchanger,
      each of the first heat exchanger and the second heat exchanger defining an open flow path extending between the at least one inlet and the at least one outlet that intersects each heat pipe of the plurality of heat pipes
         such that fluid traveling along the open flow path flows substantially freely between the plurality of heat pipes through substantially all of the open flow path and intersects and directly contacts each heat pipe of the plurality of heat pipes,
         the fluid able to travel substantially undivided along the open flow path along substantially an entire length of each heat pipe of the plurality of heat pipes within the first heat exchanger and the second heat exchanger and,
         at least some of the heat pipes of the plurality of heat pipes configured to be contacted by the fluid more than once,
      each of the first heat exchanger and the second heat exchanger being configured to transfer energy from heat transfer fluid in the plurality of heat pipes directly to the fluid traveling along the open flow path
         to condense the heat transfer fluid in the plurality of heat pipes and form a liquid able to travel within each heat pipe of the plurality of heat pipes to the reactor core.

2. The nuclear reactor of claim 1, wherein the plurality of fuel materials comprises a plurality of fuel rods.

3. The nuclear reactor of claim 1, wherein at least one of the first heat exchanger and the second heat exchanger comprises a plurality of baffles.

4. The nuclear reactor of claim 3, wherein the plurality of baffles defines an at least partially tortuous flow path between the at least one inlet and at least one outlet.

5. The nuclear reactor of claim 3, wherein the plurality of baffles defines a spiral flow path between the at least one inlet and at least one outlet.

6. The nuclear reactor of claim 1, wherein the plurality of fuel materials and the plurality of heat pipes extend through a majority of the reactor core.

7. The nuclear reactor of claim 6, wherein each heat pipe of the plurality of heat pipes lacks an exterior sleeve.

8. The nuclear reactor of claim 1, wherein each of the plurality of heat pipes comprises a closed structure having closed ends and containing the heat transfer fluid.

9. The nuclear reactor of claim 1, wherein at least some of the plurality of heat pipes extend from the first heat exchanger through the reactor core and into the second heat exchanger.

10. A method of operating the nuclear reactor of claim 1, the method comprising:
   transferring energy from a nuclear fuel material to each heat pipe of the plurality of heat pipes of the reactor core;
   at least partially changing the heat transfer fluid within each heat pipe of the plurality of heat pipes from a liquid state to a gaseous state in response to the transferring of the energy;
   moving the heat transfer fluid in the gaseous state along a length of each heat pipe of the plurality of heat pipes from the reactor core to the first heat exchanger and the second heat exchanger; and
   passing the fluid through an open volume defined by the open flow path in the first heat exchanger and the second heat exchanger to transfer at least a portion of the energy from the heat transfer fluid in the gaseous state to the fluid.

11. The method of claim 10, further comprising returning the heat transfer fluid within each heat pipe of the plurality of heat pipes from the gaseous state to the liquid state in the first heat exchanger and the second heat exchanger responsive to passing the fluid through the open volume in the first heat exchanger and the second heat exchanger.

12. The method of claim 11, further comprising moving the heat transfer fluid returned to the liquid state along the length of each heat pipe of the plurality of heat pipes from the first heat exchanger and the second heat exchanger back into the reactor core.

13. The method of claim 10, wherein passing the fluid through the open volume defined by the open flow path in the first heat exchanger and the second heat exchanger comprises flowing the fluid along a spiral flow path in the heat exchanger defined by baffles in the first heat exchanger and the second heat exchanger.

14. A nuclear reactor, comprising: a reactor core comprising:
fuel rods; and
heat pipes each comprising closed ends and containing a heat transfer fluid,
   each heat pipe of the heat pipes being positioned adjacent to at least one fuel rod of the fuel rods; and
a heat exchanger coupled to the reactor core and comprising a housing having at least one inlet and at least one outlet,
   heat pipes extending from the reactor core into the heat exchanger,
   the housing defining an undivided open volume through which a single flow path extends between the at least one inlet and at least one outlet,
   the undivided open volume of the housing encompassing substantially an entire length of substantially all of the heat pipes within the heat exchanger,
   wherein
      one of the at least one inlet and the at least one outlet is positioned at a proximal location where the heat exchanger is coupled to the reactor core and
      the other of the at least one inlet and the at least one outlet is positioned at a distal location spaced from where the heat exchanger is coupled to the reactor core,
   the heat exchanger comprising baffles extending from an exterior portion of the housing of the heat exchanger into the undivided open volume in the flow path between the at least one inlet and the at least one outlet and contacting the heat pipes,
   wherein the single flow path is configured such that substantially all of a fluid flowing through the single flow path directly contacts substantially all of the heat pipes of the plurality of heat pipes.

15. The nuclear reactor of claim 14, wherein each heat pipe of the heat pipes extends along an entire length of the fuel rods.

16. The nuclear reactor of claim 14, wherein each heat pipe of the heat pipes extends past the fuel rods and into the heat exchanger.

17. The nuclear reactor of claim 14, further comprising another heat exchanger positioned at and coupled to a first end of the reactor core, the heat exchanger coupled to a second end of the reactor core opposing the first end.

18. The nuclear reactor of claim 14, wherein the baffles each have at least one heat pipe of the heat pipes extending therethrough.

* * * * *

UNITED STATES PATENT AND TRADEMARK OFFICE
CERTIFICATE OF CORRECTION

| | | |
|---|---|---|
| PATENT NO. | : 10,910,116 B2 | Page 1 of 1 |
| APPLICATION NO. | : 15/461173 | |
| DATED | : February 2, 2021 | |
| INVENTOR(S) | : Michael G. McKellar | |

It is certified that error appears in the above-identified patent and that said Letters Patent is hereby corrected as shown below:

On the Title Page
In ITEM (72), Line 1, change "Mckellar" to --McKellar--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*